United States Patent
Xu et al.

(10) Patent No.: US 12,511,537 B2
(45) Date of Patent: Dec. 30, 2025

(54) METHOD FOR PREDICTING REMAINING USEFUL LIFE OF BEARINGS BASED ON A GATED RECURRENT NEURAL NETWORK

(71) Applicant: ZHEJIANG UNIVERSITY, Hangzhou (CN)

(72) Inventors: Zhengguo Xu, Hangzhou (CN); Zijun Que, Hangzhou (CN); Guozhen Gao, Hangzhou (CN); Peng Cheng, Hangzhou (CN); Jiming Chen, Hangzhou (CN); Wenhai Wang, Hangzhou (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 1004 days.

(21) Appl. No.: 17/591,170

(22) Filed: Feb. 2, 2022

(65) Prior Publication Data
US 2022/0253697 A1    Aug. 11, 2022

(30) Foreign Application Priority Data
Feb. 3, 2021   (CN) .......................... 202110152592.9

(51) Int. Cl.
*G06N 3/08*    (2023.01)
*G06N 3/04*    (2023.01)

(52) U.S. Cl.
CPC ................. *G06N 3/08* (2013.01); *G06N 3/04* (2013.01)

(58) Field of Classification Search
CPC ............ G06N 3/08; G06N 7/01; G06N 3/045; G06N 3/048; G06N 3/084; G06N 3/044; G06N 3/04; G06N 3/047; G06N 3/0464; G06N 3/0442; G06N 3/0495; G06N 3/049; G06F 16/29; G06F 16/35;
(Continued)

(56) References Cited

FOREIGN PATENT DOCUMENTS

| CN | 110610035 A | * 12/2019 | .......... G01M 13/045 |
| CN | 111832216 A | * 10/2020 | .......... G01M 13/045 |

* cited by examiner

*Primary Examiner* — Timothy P Graves
(74) *Attorney, Agent, or Firm* — MUNCY, GEISSLER, OLDS & LOWE, P.C.

(57) ABSTRACT

The present invention provides a method for predicting remaining useful life of bearings based on a gated recurrent neural network, comprising the following steps: S1. obtaining full life cycle vibration signals of bearings, extracting the vibration distribution features and creating a training set of gated recurrent neural network; S2. constructing a gated recurrent neural network model, and introducing an attention mechanism that directly calculates weights to improve the integrity of extracting temporal information; S3. adding a Bayesian layer to construct a nonlinear mapping relationship between temporal information and remaining useful life; S4. taking vibration signals of a test bearing as input, the output result of the gated recurrent neural network model is the remaining useful life of the test bearing at the current time. The present invention does not need to add additional neural network layers, which avoids the problem of increasing the complexity of the model. The integrity of extracted information is improved through weighted fusion of temporal information extracted at different time. Moreover, by adding a Bayesian layer, the traditional point prediction results are converted into interval predictions, to consider the prediction uncertainty of remaining useful life of bearings.

9 Claims, 3 Drawing Sheets

(58) Field of Classification Search
CPC .. G06F 18/23213; G06F 40/126; G06F 40/30; G06F 18/214; G06F 2218/00; G06F 30/20; G06F 2119/04; G06F 2218/10; G01M 13/045

See application file for complete search history.

METHOD FOR PREDICTING REMAINING USEFUL LIFE OF BEARINGS BASED ON A GATED RECURRENT NEURAL NETWORK

FIELD OF THE INVENTION

The present invention generally relates to the prediction of remaining useful life of bearings, and in particular to a method for predicting remaining useful life of bearings based on a gated recurrent neural network.

BACKGROUND

Bearings are vital components in various rotary machines and are widely used in electric power, high-speed rail, machinery, etc. However, bearing is also one of the most vulnerable parts. Bearing failure may result in potential safety hazards, increase the risk of unplanned shutdown, and even result in substantial economic losses and catastrophic accidents. Therefore, the prognostics and health management (PHM) for bearings has become a focus in recent years. With the continuous development of machine learning, the bearing remaining useful life prediction method based on gated recurrent neural network has received great attention. The conventional gated recurrent neural network is not satisfactory in terms of prediction accuracy. The introduction of attention mechanism is an effective means to improve its prediction accuracy. However, the traditional attention mechanism involves the incorporation of additional network layers, which increases the complexity of the model and results in substantial computation. In addition, the conventional gated recurrent neural network can be used only for point prediction, without considering the uncertainty caused by sensor noise, changes in operating conditions, and unknown failure modes.

SUMMARY

In order to overcome the drawbacks of low prediction accuracy and inability to deal with prediction uncertainty of the existing prediction method of remaining useful life of bearings based on a gated recurrent neural network, the present invention provides a method for predicting remaining useful life of bearings based on a gated recurrent neural network.

In order to solve the above technical problems, the invention provides the following technical solutions:

A method for predicting remaining useful life of bearings based on a gated recurrent neural network, comprising the following steps:
S1. obtaining full life cycle vibration signals of bearings, extracting the vibration distribution features and creating a training set of gated recurrent neural network;
S2. constructing a gated recurrent neural network model, and introducing an attention mechanism that directly calculates weights to improve the integrity of extracting temporal information;
S3. adding a Bayesian layer to construct a nonlinear mapping relationship between temporal information and remaining useful life, and converting conventional point prediction results into interval prediction results to consider the prediction uncertainty of bearing remaining useful life;
S4. taking vibration signals of a test bearing as input, the output result of the gated recurrent neural network model is the remaining useful life of the test bearing at the current time.

Compared to prior art, the method for predicting remaining useful life of bearings based on a gated recurrent neural network in the invention has the following advantages.

The bearing remaining useful life prediction is performed by the method for predicting remaining useful life of bearings based on a gated recurrent neural network of the present invention. In order to improve the ability of the gated recurrent neural network to extract and input effective information of feature time series, a method of direct calculation of attention weight is proposed. The method does not need to add additional neural network layers, which avoids the problem of increasing the complexity of the model. The integrity of extracted information is improved through weighted fusion of temporal information extracted at different time. Moreover, by adding a Bayesian layer, the traditional point prediction results are converted into interval predictions, to consider the prediction uncertainty of remaining useful life of bearings.

Further, the step S1 specifically comprises the following steps: S101. Extracting features related to vibration distribution from the full life cycle vibration signals of bearings; S102. Normalizing the extracted features describing the vibration distribution; S103. Using a time window to construct temporal input data and create a training set. Further, in the step S101, the vibration signal at the time t is defined as $S_t = [s_{t_1}, s_{t_2}, \ldots, s_{t_l}]$, where l is the length of time of sampling, then extracted features describing the distribution of vibration signals are as follows:

| Number | Feature | Equation |
|---|---|---|
| $F1_t$ | Mean Index | $Mean_t = \frac{1}{l} \sum_{i=1}^{l} s_{t_i}$ |
| $F2_t$ | RMS Index | $RMS_t = \sqrt{\frac{\sum_{i=1}^{l} s_{t_i}^2}{l}}$ |
| $F3_t$ | Range Index | $Range_t = \max(S_t) - \min(S_t)$ |
| $F4_t$ | Standard Deviation Index | $Std_t = \sqrt{\frac{\sum_{i=1}^{l}(s_{t_i} - Mean_t)^2}{l}}$ |
| $F5_t$ | Skewness Index | $Ske_t = E\left[\left(\frac{S_t - Mean_t}{Std_t}\right)^3\right]$ |
| $F6_t$ | Kurtosis Index | $Kur_t = E\left[\left(\frac{S_t - Mean_t}{Std_t}\right)^4\right]$ |
| $F7_t$ | Shape Index | $Sha_t = \frac{RMS_t}{\frac{1}{l}\sum_{i=1}^{l}|s_{t_i}|}$ |
| $F8_t$ | Margin Index | $Mar_t = \frac{\max(S_t)}{\left|\frac{1}{l}\sum_{i=1}^{l}\sqrt{|s_{t_i} - Mean_t|}\right|}$ |
| $F9_t$ | Impulse Index | $Sha_t = \frac{\max(S_t)}{\frac{1}{l}\sum_{i=1}^{l}|s_{t_i}|}$ |
| $F10_t$ | Crest Index | $Cre_t = \frac{\max(S_t)}{RMS_t}$ |

Further, in the step S103, using a time window to construct a time sequence to meet the input requirements of the gated recurrent neural network; using a time window to process the normalized features, and the time window is defined as:

$$TW_t = \{C_{t-L+1}, C_{t-L+1}, \ldots, C_t\} \quad (1)$$

Where L is the length of the time window, and C is the set of normalized features;

Each time when the time window moves backward by one time, the training set finally created is $\{TW_t, R_t\}$, where $R_t$ is the corresponding remaining useful life.

Further, the step S2 specifically comprises the following steps: S201. extracting time-series features from the input features using a stacked gated recurrent neural network; S202. introducing an attention mechanism that directly calculates the weights, assigning different weights to the time-series features extracted by the gated recurrent neural network at each time, and weighing them to obtain the final time-series features.

Further, a stacked gated recurrent neural network structure is used in the step S201, namely, the output of a previous gated recurrent neural network is used as the input of the current gated recurrent neural network, to improve the ability of the overall network to extract time-series features; after stacking gated recurrent neural network, the extracted feature at each time is $H_t = \{h_t^1, h_t^2, \ldots, h_t^L\}$.

Further, in the step S202, an attention mechanism that directly calculates the weight is introduced, and a weight is assigned to the time-series features extracted at each time, and the information integrity is improved through weighted fusion. The weight is directly calculated through the dynamic time warping (DTW) algorithm.

Two matrices are supposed to be $P = [p_1, p_2, \ldots, p_n]$ and $Q = [q_1, q_2, \ldots, q_m]$, respectively, where n and m are the length of the matrices respectively. A matrix $MT_{a,b}$ with a size of n×m is constructed to measure the distance between $P_a$ and $Q_b$:

$$MT_{a,b} = (P_a - Q_b)^2 \quad (2)$$

Then, the shortest warping path is defined as:

$$E_{a,b} = (P_a - Q_b)^2 + \min\{E_{a,b-1}, E_{a-1,b}, E_{a-1,b-1}\} \quad (3)$$

$$E_{1,1} = (P_1 - Q_1)^2 \quad (4)$$

The result obtained is the similarity of the two matrices; this algorithm is used to calculate the similarity $w_{attn_i}$ between $H_t$ and $R_t$ at each time, and softmax normalization is performed to obtain the weight corresponding to each time:

$$w_{norm_t}^i = \frac{\exp(w_{attn_t}^i)}{\sum_{i=1}^L \exp(w_{attn_i}^i)} \quad (5)$$

Finally, the final extracted temporal information is obtained by weighting:

$$\text{output}_t = w_{norm_t}^1 h_1 + w_{norm_t}^2 h_2 + \ldots w_{norm_t}^L h_L \quad (6)$$

Further, the step S3 specifically comprises the following step: S301. Adding a Bayesian layer to construct a nonlinear mapping relationship between temporal information and remaining useful life, and converting conventional point prediction results into interval prediction results.

The Bayesian layer is considered to be a simple feedforward neural network:

$$R_t = g^{WFC}(\text{output}_t) \quad (7)$$

The Bayesian layer handles uncertainty by converting the weight of the feedforward neural network from a fixed parameter to a parameter that obeys a certain distribution. According to Bayesian theory, the posterior probability of the weight w that needs to be calculated is:

$$p(\omega|X, Y) = \frac{p(\omega)p(Y|X, \omega)}{\int p(Y|X, \omega)p(\omega)d\omega} \quad (9)$$

Where X is the input of the feedforward neural network, and Y is the output of the feedforward neural network.

Since $p(\omega|X,Y)$ cannot be calculated directly, it is approximated by a simple distribution $q(\omega)$. The similarity between two distributions is measured using Kullback-Leibler divergence. The problem of direct calculation $p(\omega|X,Y)$ is converted to an optimization problem of optimizing parameter $\phi$ to minimize Kullback-Leibler divergence, that is, the loss function of the Bayesian layer is:

$$F = KL(q(\omega)\|p(\omega)) - E_{q(\omega)}[\log p(Y,X|\omega)] \quad (8)$$

Further, the step S4 specifically comprises the following steps: S401. extracting vibration distribution features from the vibration signals of test samples; S402. inputting the features of extracted test samples into a trained neural network, then outputting the result, that is, the remaining useful life of the test samples at the current time.

DETAILED DESCRIPTION

Figure 1:
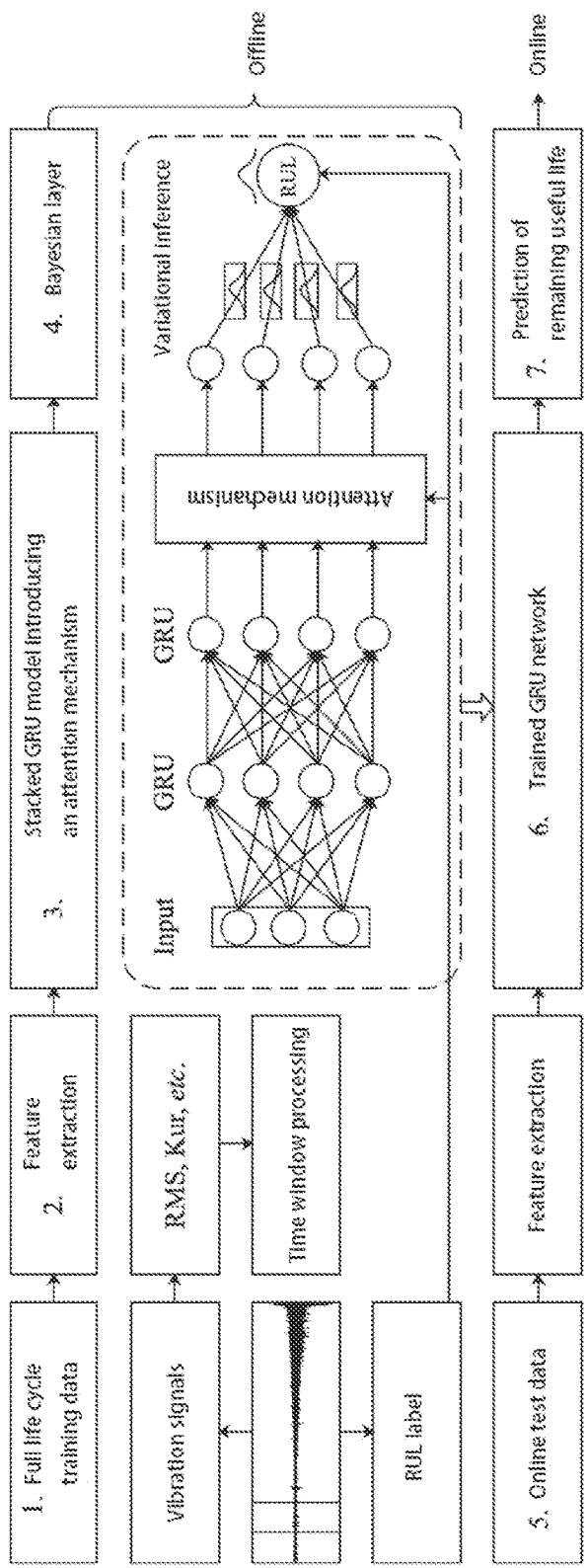
FIG. 1 is a flowchart of a method for predicting remaining useful life of bearings based on a gated recurrent neural network.
Figure 2:
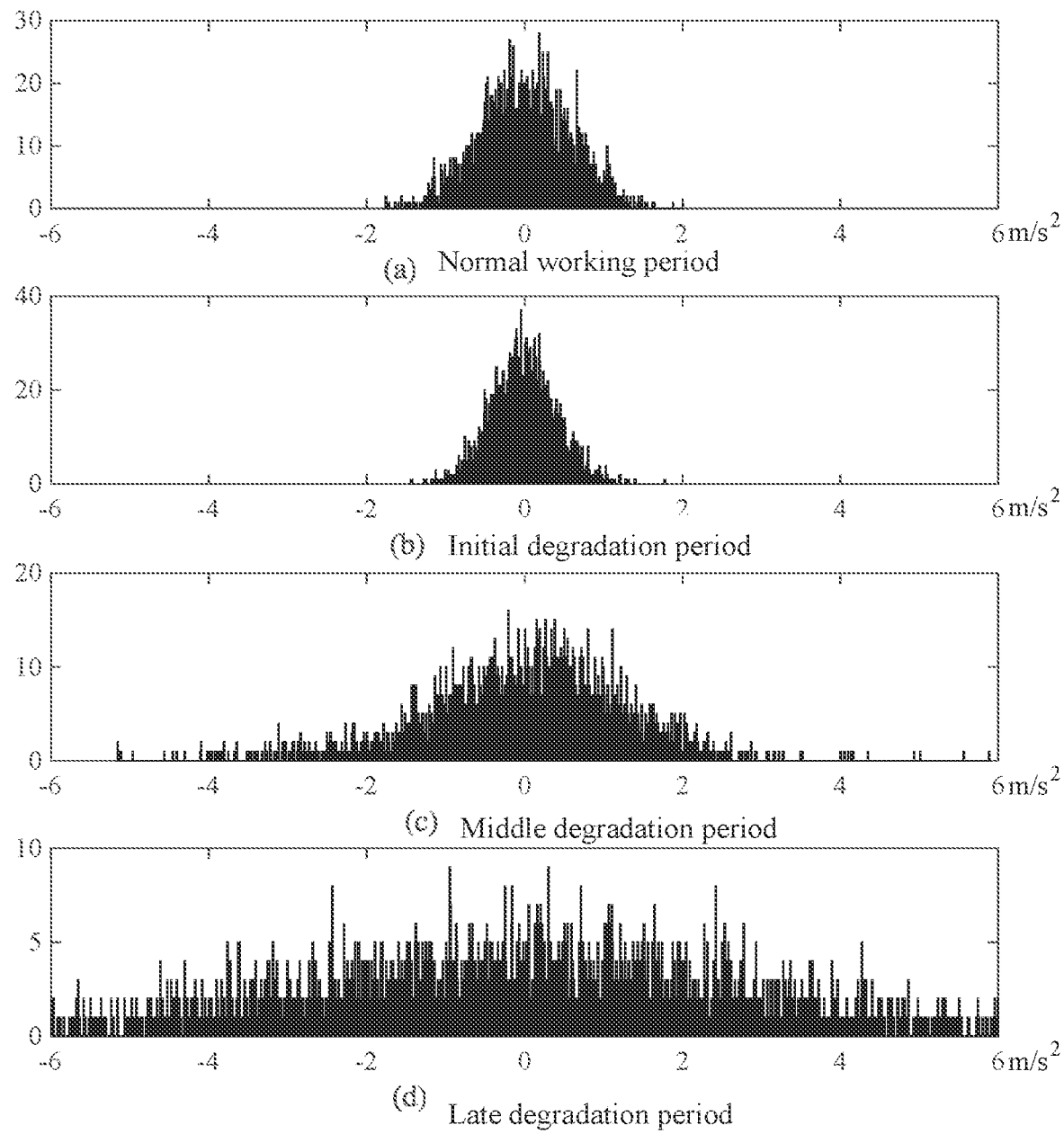
FIG. 2 is a distribution diagram of bearing vibration signals in different degradation periods.

In this embodiment, the method for predicting remaining useful life of bearings based on a gated recurrent neural network is performed using the full-cycle life data of PRONOSTIA platform bearings. The specific process is as follows:

(1) The full life cycle vibration signals of bearings are obtained. The vibration signals in the horizontal and vertical directions are collected by an acceleration sensor. Signals are collected every 10 s, with duration of 0.1 s each time. The sampling frequency for data acquisition is 25.6 kHz;

(2) The bearing degradation process can be roughly divided into four periods: normal working period, initial degradation period, middle degradation period and late degradation period. The distribution of vibration signals at different degradation periods has obvious differences in the bearing degradation process, as shown in FIG. 2. Therefore, the degradation of bearings can be described by extracting the features related to the distribution of bearing vibration signals. The vibration signal at the time t is defined as $S_t = [s_{t_1}, s_{t_2}, \ldots, s_{t_l}]$, where l is the length of time of sampling, then extracted features describing the distribution of vibration signals are as follows:

| Number | Feature | Equation |
|---|---|---|
| $F1_t$ | Mean Index | $Mean_t = \frac{1}{l}\sum_{i=1}^{l} s_{t_i}$ |
| $F2_t$ | RMS Index | $RMS_t = \sqrt{\frac{\sum_{i=1}^{l} s_{t_i}^2}{l}}$ |
| $F3_t$ | Range Index | $Range_t = \max(S_t) - \min(S_t)$ |
| $F4_t$ | Standard Deviation Index | $Std_t = \sqrt{\frac{\sum_{i=1}^{l}(s_{t_i} - Mean_t)^2}{l}}$ |
| $F5_t$ | Skewness Index | $Ske_t = E\left[\left(\frac{S_t - Mean_t}{Std_t}\right)^3\right]$ |
| $F6_t$ | Kurtosis Index | $Kur_t = E\left[\left(\frac{S_t - Mean_t}{Std_t}\right)^4\right]$ |
| $F7_t$ | Shape Index | $Sha_t = \dfrac{RMS_t}{\frac{1}{l}\sum_{i=1}^{l}\|s_{t_i}\|}$ |
| $F8_t$ | Margin Index | $Mar_t = \dfrac{\max(S_t)}{\left\|\frac{1}{l}\sum_{i=1}^{l}\sqrt{\|s_{t_i} - Mean_t\|}\right\|}$ |
| $F9_t$ | Impulse Index | $Sha_t = \dfrac{\max(S_t)}{\frac{1}{l}\sum_{i=1}^{l}\|s_{t_i}\|}$ |
| $F10_t$ | Crest Index | $Cre_t = \dfrac{\max(S_t)}{RMS_t}$ |

Figure 3:
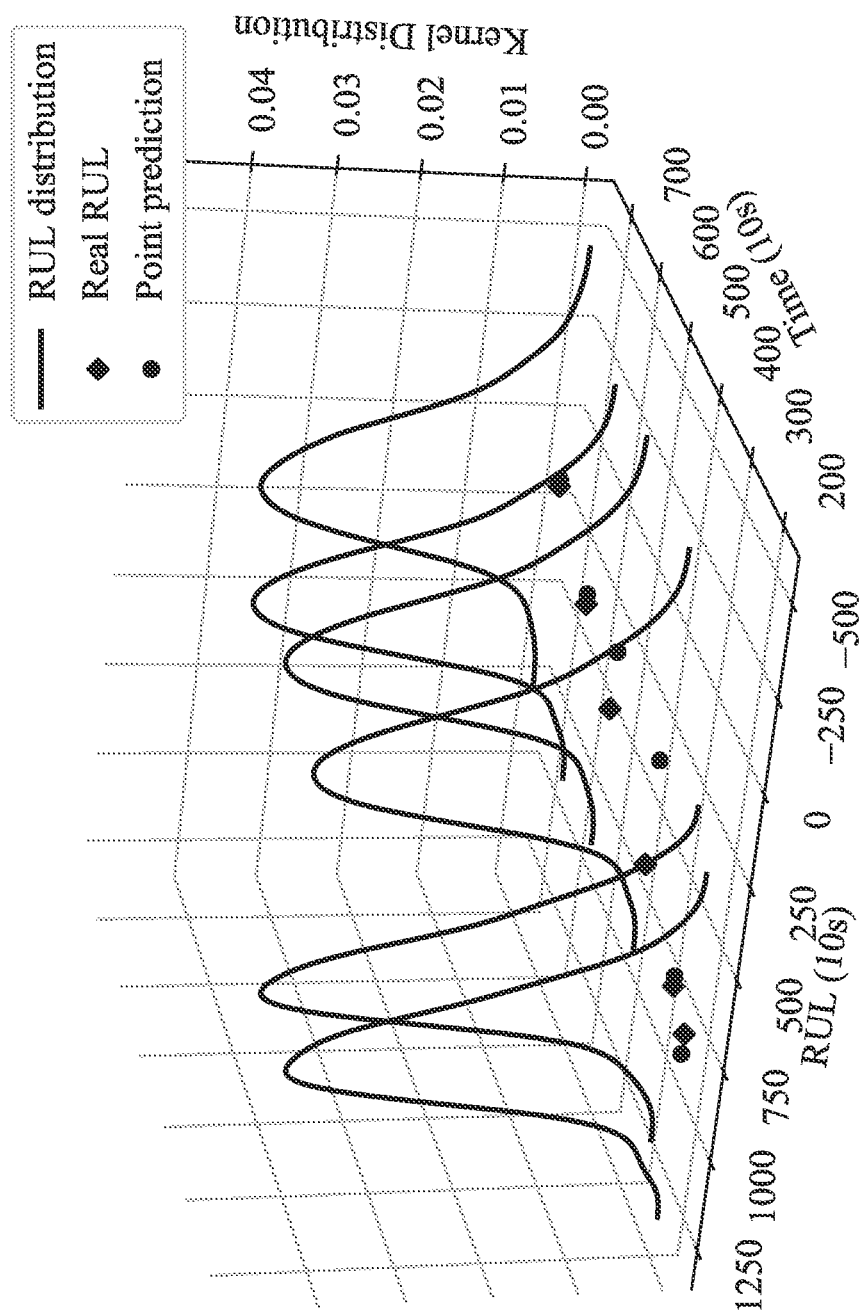
FIG. 3 is test results of the method for predicting remaining useful life of bearings based on a gated recurrent neural network.

(3) FIG. 3 is the result of useful life prediction. The time sequence is constructed using the time window, to meet the input requirements of the gated recurrent neural network; and the normalized features are processed using the time window. The time window is defined as:

$$TW_t = \{C_{t-L+1}, C_{t-L+1}, \ldots, C_t\} \quad (1)$$

Where L is the length of the time window, and C is the set of normalized features;

Each time when the time window moves backward by one time, the training set finally created is $\{TW_t, R_t\}$, where $R_t$ is the corresponding remaining useful life.

A stacked gated recurrent neural network structure is used, namely, the output of a previous gated recurrent neural network is used as the input of the current gated recurrent neural network, to improve the ability of the overall network to extract time-series features; after stacking gated recurrent neural network, the extracted feature at each time is $H_t = \{h_t^1, h_t^2, \ldots, h_t^L\}$.

An attention mechanism that directly calculates the weight is introduced, and a weight is assigned to the time-series features extracted at each time, and the information integrity is improved through weighted fusion; the weight is directly calculated through the dynamic time warping (DTW) algorithm.

Finally, the final extracted temporal information is obtained by weighting:

$$output_t = w_{norm_t}^1 h_1 + w_{norm_t}^2 h_2 + \ldots w_{norm_t}^L h_L \quad (6)$$

The useful life prediction results include the results of point prediction and interval prediction. The result of point prediction is not much different from that of the real remaining useful life, indicating that the introduced attention mechanism can effectively improve the prediction accuracy. Through the addition of Bayesian layer, the conventional point prediction results are converted into interval prediction results, to process the uncertainties caused by sensor noises, changes in operating conditions and unknown failure modes. According to statistics, 84.3% of the real remaining useful life is within the 95% confidence interval of the prediction, indicating that the method has a good effect in interval prediction.

The invention claimed is:

1. A method for predicting remaining useful life of bearings based on a gated recurrent neural network, comprising the following steps:
    S1. obtaining full life cycle vibration signals of bearings, extracting the vibration distribution features and creating a training set of gated recurrent neural network;
    S2. constructing a gated recurrent neural network model, and introducing an attention mechanism implemented via a dynamic time warping algorithm that directly calculates weights for the time-series features extracted by the gated recurrent neural network at each time, thereby improving the integrity of extracting temporal information;
    S3. adding a Bayesian layer implemented as a simple feedforward neural network that converts the weight from a fixed parameter to a parameter obeying a certain distribution to construct a nonlinear mapping relationship between temporal information and remaining useful life subsequently, train the gated recurrent neural network model on the training set;
    S4. taking vibration signals of a test bearing as input, the output result of the trained gated recurrent neural network model is the remaining useful life of the test bearing at the current time.

2. The method for predicting remaining useful life of bearings based on a gated recurrent neural network according to claim 1, wherein the step S1 specifically comprises the following steps:
    S101. extracting features related to vibration distribution from the full life cycle vibration signals of bearings;
    S102. normalizing the extracted features describing the vibration distribution;
    S103. using a time window to construct temporal input data and create a training set.

3. The method for predicting remaining useful life of bearings based on a gated recurrent neural network according to claim 2, wherein in the step S101, the vibration signal at the time t is defined as $S_t = [S_{t_1}, S_{t_2}, \ldots, S_{t_l}]$, where l is the length of time of sampling, then extracted features describing the distribution of vibration signals are as follows:

$F1_t$ is a Mean Index that is calculated by $$Mean_t = \frac{1}{l}\sum_{i=1}^{l} s_{t_i},$$

$F2_t$ is an RMS Index that is calculated by $$RMS_t = \sqrt{\frac{\sum_{i=1}^{l} s_{t_i}^2}{l}},$$

$F3_t$ is a Range Index that is calculated by $\text{Range}_t = \max(S_t) - \min(S_t)$, $F4_t$ is a Standard Deviation index that is calculated by $$Std_t = \sqrt{\frac{\sum_{i=1}^{l}(s_{t_i} - \text{Mean}_t)^2}{l}},$$

$F5_t$ is Skewness Index that is calculated by $$Ske_t = E\left[\left(\frac{S_t - \text{Mean}_t}{Std_t}\right)^3\right],$$

$F6_t$ is a Kurtosis Index that is calculated by $$Kur_t = E\left[\left(\frac{S_t - \text{Mean}_t}{Std_t}\right)^4\right],$$

$F7_t$ is a Shape Index that is calculated by $$Sha_t = \frac{RMS_t}{\frac{1}{l}\sum_{i=1}^{l}|s_{t_i}|},$$

$F8_t$ is a Margin Index that is calculated by $$Mar_t = \frac{\max(S_t)}{\left|\frac{1}{l}\sum_{i=1}^{l}\sqrt{|s_{t_i} - \text{Mean}_t|}\right|},$$

$F9_t$ is an Impulse Index that is calculated by $$Sha_t = \frac{\max(S_t)}{\frac{1}{l}\sum_{i=1}^{l}|s_{t_i}|}, \text{ and}$$

$F10_t$ is a Crest index that is calculated by $$Cre_t = \frac{\max(S_t)}{RMS_t}.$$

4. The method for predicting remaining useful life of bearings based on a gated recurrent neural network according to claim 2, wherein in the step S103, using a time window to construct a time sequence to meet the input requirements of the gated recurrent neural network; using a time window to process the normalized features, and the time window is defined as:

$$TW_t = \{C_{t-L+1}, C_{t-L+1}, \ldots, C_t\} \quad (1)$$

where L is the length of the time window, and C is the set of normalized features;

each time when the time window moves backward by one time, the training set finally created is $\{TW_t, R_t\}$, where $R_t$ is the corresponding remaining useful life.

5. The method for predicting remaining useful life of bearings based on a gated recurrent neural network according to claim 1, wherein the step S2 specifically comprises the following steps:

S201. extracting time-series features from the input features using a stacked gated recurrent neural network;

S202. introducing an attention mechanism implemented via a dynamic time warping algorithm that directly calculates the weights, assigning different weights to the time-series features extracted by the gated recurrent neural network at each time, and performs a weighted sum of these time-series features to obtain the final time-series features.

6. The method for predicting remaining useful life of bearings based on a gated recurrent neural network according to claim 5, wherein a stacked gated recurrent neural network structure is used in the step S201, namely, the output of a previous gated recurrent neural network is used as the input of the current gated recurrent neural network, to improve the ability of the overall network to extract time-series features; after stacking gated recurrent neural network, the extracted feature at each time is $H_t = \{h_t^1, h_t^2, \ldots, h_t^L\}$.

7. The method for predicting remaining useful life of bearings based on a gated recurrent neural network according to claim 5, wherein in the step S202, an attention mechanism that directly calculates the weight is introduced, and a weight is assigned to the time-series features extracted at each time, and the information integrity is improved through weighted fusion; the weight is directly calculated through the dynamic time warping (DTW) algorithm;

two matrices are supposed to be $P = [p_1, p_2, \ldots, p_n]$ and $Q = [q_1, q_2, \ldots, q_m]$, respectively, where n and m are the length of the matrices respectively; a matrix $MT_{a,b}$ with a size of n×m is constructed to measure the distance between $P_a$ and $Q_b$:

$$MT_{a,b} = (P_a - Q_b)^2 \quad (2)$$

then, the shortest warping path is defined as:

$$E_{a,b} = (P_a - Q_b)^2 + \min\{E_{a,b-1}, E_{a-1,b}, E_{a-1,b-1}\} \quad (3)$$

$$E_{1,1} = (P_1 - Q_1)^2 \quad (4)$$

the result obtained is the similarity of the two matrices; this algorithm is used to calculate the similarity $w_{attn}$; between $H_t$ and $R_t$ at each time, and softmax normalization is performed to obtain the weight corresponding to each time:

$$w_{norm_t}^i = \frac{\exp(w_{attn_t}^i)}{\sum_{i=1}^{L}\exp(w_{attn_t}^i)} \quad (5)$$

finally, the final extracted temporal information is obtained by weighting:

$$\text{output}_t = w_{norm_t}^1 h_1 + w_{norm_t}^2 h_2 + \ldots w_{norm_t}^L h_L \quad (6).$$

8. The method for predicting remaining useful life of bearings based on a gated recurrent neural network according to claim 1, wherein the step S3 specifically comprises the following step:

S301. adding a Bayesian layer implemented as a simple feedforward neural network that converts the weight from a fixed parameter to a parameter obeying a certain distribution to construct a nonlinear mapping relationship between temporal information and remaining useful life, and converting conventional point prediction results into interval prediction results using Kullback-Leibler divergence to optimize parameters, and the Bayesian layer is considered to be a simple feedforward neural network:

$$R_t = g^{W_{FC}}(output_t) \qquad (7)$$

the Bayesian layer handles uncertainty by converting the weight of the feedforward neural network from a fixed parameter to a parameter that obeys a certain distribution; approximates the posterior probability $p(\omega|X, Y)$ of the weight obeyed by a simple distribution $q(\omega)$; measures the similarity between two distributions using Kullback-Leibler divergence; the problem of direct calculation $p(\omega|X,Y)$ is converted to an optimization problem of optimizing parameter $\phi$ to minimize Kullback-Leibler divergence, that is, the loss function of the Bayesian layer is:

$$F = KL(q(\omega)\|p(\omega)) - E_{q(\omega)}[\log p(Y,X|\omega)] \qquad (8).$$

9. The method for predicting remaining useful life of bearings based on a gated recurrent neural network according to claim 1, wherein step S4 specifically comprises the following steps:
S401. extracting vibration distribution features from the vibration signals of test samples;
S402. inputting the features of extracted test samples into a trained neural network, then outputting the result, that is, the remaining useful life of the test samples at the current time.

* * * * *